United States Patent
Sudo et al.

(10) Patent No.: US 9,650,571 B2
(45) Date of Patent: *May 16, 2017

(54) NEMATIC LIQUID CRYSTAL COMPOSITION AND LIQUID CRYSTAL DISPLAY DEVICE

(71) Applicant: DIC CORPORATION, Tokyo (JP)

(72) Inventors: Go Sudo, Kita-adachi-gun (JP); Shotaro Kawakami, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/427,162

(22) PCT Filed: Sep. 10, 2013

(86) PCT No.: PCT/JP2013/074359
§ 371 (c)(1),
(2) Date: Mar. 10, 2015

(87) PCT Pub. No.: WO2014/042145
PCT Pub. Date: Mar. 20, 2014

(65) Prior Publication Data
US 2015/0315468 A1    Nov. 5, 2015

(30) Foreign Application Priority Data

Sep. 11, 2012 (JP) ................................. 2012-199424

(51) Int. Cl.
| | | |
|---|---|---|
| *C09K 19/20* | (2006.01) | |
| *C09K 19/30* | (2006.01) | |
| *C09K 19/54* | (2006.01) | |
| *C09K 19/02* | (2006.01) | |
| *C09K 19/04* | (2006.01) | |
| *C09K 19/12* | (2006.01) | |

(52) U.S. Cl.
CPC ...... *C09K 19/3066* (2013.01); *C09K 19/0216* (2013.01); *C09K 19/20* (2013.01); *C09K 19/542* (2013.01); *C09K 2019/0448* (2013.01); *C09K 2019/122* (2013.01); *C09K 2019/301* (2013.01); *C09K 2019/3004* (2013.01); *C09K 2019/3009* (2013.01); *C09K 2019/3016* (2013.01); *C09K 2019/548* (2013.01)

(58) Field of Classification Search
CPC .............................................. C09K 2019/0411
See application file for complete search history.

(56) References Cited

U.S. PATENT DOCUMENTS

| | | |
|---|---|---|
| 5,384,065 A | 1/1995 | Geelhaar et al. |
| 5,599,480 A | 2/1997 | Tarumi et al. |
| 7,670,504 B2 | 3/2010 | Kawakami et al. |
| 2002/0014613 A1 | 2/2002 | Klasen et al. |
| 2003/0222245 A1 | 12/2003 | Klasen-Memmer et al. |
| 2004/0065866 A1 | 4/2004 | Kato et al. |
| 2006/0238696 A1* | 10/2006 | Wen .................. C09K 19/02 349/187 |
| 2009/0090892 A1 | 4/2009 | Fujita et al. |
| 2011/0001918 A1 | 1/2011 | Saito |
| 2011/0175027 A1 | 7/2011 | Hattori et al. |
| 2012/0161072 A1 | 6/2012 | Saito et al. |
| 2012/0228549 A1 | 9/2012 | Klasen-Memmer et al. |
| 2012/0229744 A1 | 9/2012 | Hattori et al. |
| 2013/0105731 A1 | 5/2013 | Ito et al. |
| 2013/0334462 A1 | 12/2013 | Sudo et al. |

FOREIGN PATENT DOCUMENTS

| | | |
|---|---|---|
| EP | 0 474 062 A2 | 3/1992 |
| JP | 8-104869 A | 4/1996 |
| JP | 2001-354967 A | 12/2001 |
| JP | 2003-327965 A | 11/2003 |
| JP | 2006-37054 A | 2/2006 |
| JP | 2006-233182 A | 9/2006 |
| JP | 2006-301643 A | 11/2006 |
| JP | 2007-2132 A | 1/2007 |
| JP | 2008-208365 A | 9/2008 |

(Continued)

OTHER PUBLICATIONS

International Search Report datd Dec. 3, 2013 issued in corresponding application No. PCT/JP2013/074359.
International Search Report dated Aug. 13, 2013 issued in application No. PCT/JP2013/067484 Counterpart of U.S. Appl. No. 14/406,341 (2 pages).
Office Action dated Jun. 4, 2015, issued in U.S. Appl. No. 14/406,341 (15 pages).
Office Action dated Dec. 14, 2015, issued in U.S. Appl. No. 14/406,341 (8 pages).
Non-Final Office Action dated Apr. 8, 2016, issued in U.S. Appl. No. 14/406,341 (15 pages).

*Primary Examiner* — Chanceity Robinson
(74) *Attorney, Agent, or Firm* — Westerman, Hattori, Daniels & Adrian, LLP

(57) ABSTRACT

There is provided a liquid crystal composition having a sufficiently low viscosity ($\eta$), a sufficiently low rotational viscosity ($\gamma 1$), a high elastic constant ($K_{33}$), and negative $\Delta \in$ with a high absolute value without decreasing the refractive index anisotropy ($\Delta n$) and the nematic phase-isotropic liquid phase transition temperature ($T_{ni}$); and a liquid crystal display device with a VA mode or the like that uses the liquid crystal composition and has high display quality and high response speed. The liquid crystal display device that uses the liquid crystal composition of the present invention has a distinguished feature of high-speed response and is particularly useful as an active matrix driving liquid crystal display device. The liquid crystal display device is applicable to a VA mode, PSVA mode, PSA mode, IPS mode, or ECB mode liquid crystal display device.

15 Claims, No Drawings

(56) References Cited

FOREIGN PATENT DOCUMENTS

| | | |
|---|---|---|
| JP | 2009-149667 A | 7/2009 |
| JP | 2011-12179 A | 1/2011 |
| JP | 2011-144274 A | 7/2011 |
| JP | 2012-97222 A | 5/2012 |
| JP | 2012-097222 A1 * | 5/2012 |
| JP | 2012-136623 A | 7/2012 |
| WO | 2007/077872 A1 | 7/2007 |
| WO | 2011/055643 A1 | 5/2011 |
| WO | 2011/158820 A1 | 12/2011 |
| WO | 2012/086504 A1 | 6/2012 |
| WO | WO 2012086504 A1 * | 6/2012 ............. C09K 19/12 |

* cited by examiner

NEMATIC LIQUID CRYSTAL COMPOSITION AND LIQUID CRYSTAL DISPLAY DEVICE

TECHNICAL FIELD

The present invention relates to a nematic liquid crystal composition which has a negative dielectric anisotropy ($\Delta\varepsilon$) and is useful as a liquid crystal display material, and to a liquid crystal display device using the nematic liquid crystal composition.

BACKGROUND ART

Liquid crystal display devices have been used for clocks, calculators, household electric appliances, measuring instruments, panels for automobiles, word processors, electronic organizers, printers, computers, televisions, etc. Typical examples of a liquid crystal display mode include a TN (twisted nematic) mode, an STN (super twisted nematic) mode, a DS (dynamic scattering) mode, a GH (guest-host) mode, an IPS (in-plane switching) mode, an OCB (optically compensated birefringence) mode, an ECB (electrically controlled birefringence) mode, a VA (vertical alignment) mode, a CSH (color super-homeotropic) mode, and FLC (ferroelectric liquid crystal). Examples of a driving method include static driving, multiplex driving, passive matrix driving, and active matrix (AM) driving performed using TFTs (thin film transistors), TFDs (thin film diodes), and the like.

In an IPS mode, an ECB mode, a VA mode, a CSH mode, or the like among these display modes, a liquid crystal composition having negative $\Delta\varepsilon$ is used. In particular, a VA mode by AM driving is used for display devices required to have high-speed response and a wide viewing angle, such as televisions.

A liquid crystal composition containing the following liquid crystal compounds (A) and (B) having a 2,3-difluorophenylene skeleton (refer to PTL 1) has been disclosed as a liquid crystal composition having negative $\Delta\varepsilon$.

[Chem. 1]

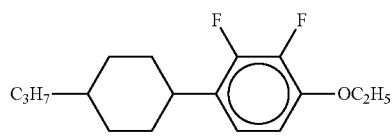
(A)

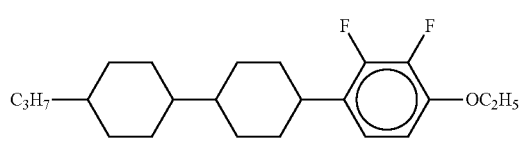
(B)

This liquid crystal composition contains liquid crystal compounds (C) and (D) as liquid crystal compounds whose $\Delta\varepsilon$ is substantially zero. However, a sufficiently low viscosity has not been achieved in liquid crystal compositions required to have high-speed response for liquid crystal televisions or the like.

[Chem. 2]

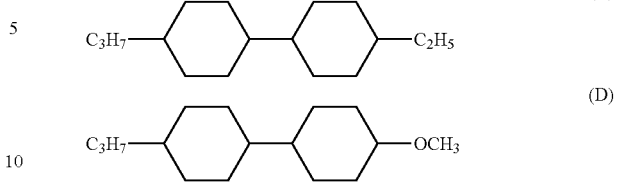

A liquid crystal composition containing a liquid crystal compound (E) has been disclosed. There have been proposed a liquid crystal composition containing the liquid crystal compound (E) together with the liquid crystal compound (D) to achieve a low refractive index anisotropy $\Delta n$ (refer to PTL 2) and a liquid crystal composition to which a liquid crystal compound (F) is added to improve the response speed (refer to PTL 3).

[Chem. 3]

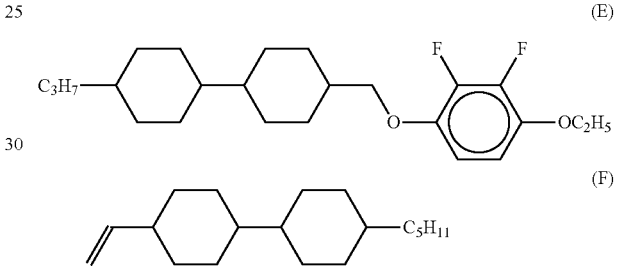

A liquid crystal composition containing a liquid crystal compound (G) and the liquid crystal compound (F) has also been disclosed (refer to PTL 4). However, a higher response speed has been required.

[Chem. 4]

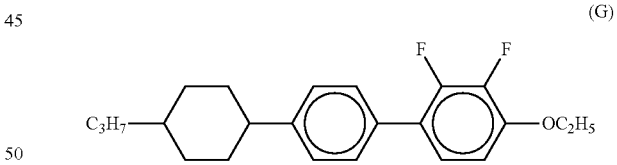

A liquid crystal composition containing the liquid crystal compound (A), the liquid crystal compound (G), and a liquid crystal compound whose $\Delta\varepsilon$ is substantially zero and which is represented by formula (I) in a combined manner has been disclosed (refer to PTL 5). In the production process of liquid crystal display devices, however, an extremely low pressure is required when a liquid crystal composition is injected into a liquid crystal cell. Therefore, a compound having low vapor pressure is volatilized and thus it is believed that the content of such a compound cannot be increased. Consequently, in the liquid crystal composition, the content of the liquid crystal compound represented by the formula (I) is limited, and thus the liquid crystal composition exhibits high $\Delta n$, but unfavorably has a considerably high viscosity.

[Chem. 5]

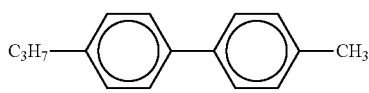

(I)

Furthermore, a liquid crystal composition containing a compound having a terphenyl structure subjected to substitution with fluorine has also been disclosed in PTL 6 and PTL 7.

It has been disclosed in PTL 8 that the response speed of a homeotropic liquid crystal cell is improved by using a liquid crystal material having a large index represented by (formula 1), but the improvement is not sufficient.

[Math. 1]

$$FoM = K_{33} \cdot \Delta n^2 / \gamma 1 \quad \text{(Formula 1)}$$

$K_{33}$: elastic constant
$\Delta n$: refractive index anisotropy
$\gamma 1$: rotational viscosity In liquid crystal compositions required to have high-speed response for liquid crystal televisions or the like, the following has been required: the refractive index anisotropy ($\Delta n$) and the nematic phase-isotropic liquid phase transition temperature ($T_{ni}$) are not decreased, the viscosity ($\eta$) is sufficiently decreased, the rotational viscosity ($\gamma 1$) is sufficiently decreased, and the elastic constant ($K_{33}$) is increased.

CITATION LIST

Patent Literature

PTL 1: Japanese Unexamined Patent Application Publication No. 8-104869
PTL 2: European Patent Application Publication No. 0474062
PTL 3: Japanese Unexamined Patent Application Publication No. 2006-037054
PTL 4: Japanese Unexamined Patent Application Publication No. 2001-354967
PTL 5: WO2007/077872
PTL 6: Japanese Unexamined Patent Application Publication No. 2003-327965
PTL 7: WO2007/077872
PTL 8: Japanese Unexamined Patent Application Publication No. 2006-301643

SUMMARY OF INVENTION

Technical Problem

It is an object of the present invention to provide a liquid crystal composition having a sufficiently low viscosity ($\eta$), a sufficiently low rotational viscosity ($\gamma 1$), a high elastic constant ($K_{33}$), and a negative dielectric anisotropy ($\Delta \in$) with a high absolute value without decreasing the refractive index anisotropy ($\Delta n$) and the nematic phase-isotropic liquid phase transition temperature ($T_{ni}$), and to provide a liquid crystal display device with a VA mode or the like that uses the liquid crystal composition and has high display quality and high response speed.

Solution to Problem

The present inventors have conducted studies on various fluorobenzene derivatives and have found that the above object can be achieved by combining particular compounds. Thus, the present invention has been completed.

The present invention provides a liquid crystal composition containing one or more fluorobenzene derivatives having a 1-propenyl group as a first component and one or more liquid crystal compounds having negative $\Delta \in$ with an absolute value of 3 or more as a second component. The present invention also provides a liquid crystal display device that uses the liquid crystal composition.

Advantageous Effects of Invention

The liquid crystal composition of the present invention is a liquid crystal composition having a sufficiently low viscosity ($\eta$), a sufficiently low rotational viscosity ($\gamma 1$), and a high elastic constant ($K_{33}$) without decreasing the refractive index anisotropy ($\Delta n$) and the nematic phase-isotropic liquid phase transition temperature ($T_{ni}$), and a liquid crystal display device with a VA mode or the like that has high display quality and high response speed can be provided by using the liquid crystal composition.

DESCRIPTION OF EMBODIMENTS

The liquid crystal composition of the present invention contains one or more fluorobenzene derivatives having a 1-propenyl group as a first component, and preferably contains 1 to 15 of the fluorobenzene derivatives and more preferably contains 2 to 10 of the fluorobenzene derivatives.

The fluorobenzene derivative having a 1-propenyl group is specifically a compound in which a mesogenic skeleton having a 2,3-difluoro phenyl group has a 1-propenyl group as a terminal group, and preferably a compound represented by general formula (I).

[Chem. 6]

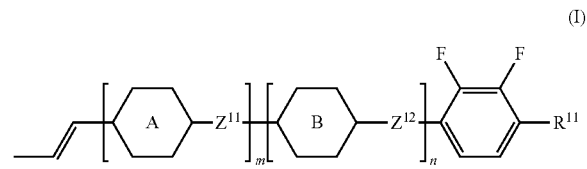

(I)

In the formula, $R^{11}$ represents an alkyl group having 1 to 8 carbon atoms, an alkoxy group having 1 to 8 carbon atoms, an alkenyl group having 2 to 8 carbon atoms, or an alkenyloxy group having 2 to 8 carbon atoms. $R^{11}$ preferably represents an alkyl group having 1 to 5 carbon atoms, an alkoxy group having 1 to 5 carbon atoms, an alkenyl group having 2 to 5 carbon atoms, or an alkenyloxy group having 2 to 5 carbon atoms. $Z^{11}$ and $Z^{12}$ each independently represent —OCH$_2$—, —CH$_2$O—, —CF$_2$O—, —OCF$_2$—, —CH$_2$CH$_2$—, —CF$_2$CF$_2$—, or a single bond, preferably each independently represent —CH$_2$O—, —CF$_2$O—, or a single bond, and more preferably each independently represent —CH$_2$O— or a single bond. Ring A and Ring B each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group. Ring A and Ring B preferably each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, or a 2,3-difluoro-1,4-phenylene group and more preferably each independently represent a trans-1,4-cyclohexylene group or a 1,4-phenylene group. Furthermore, m and n each independently represent 0, 1, or 2 and preferably each independently represent 0 or 1, and m+n preferably represents 1 or 2.

The content of the compounds represented by the general formula (I) is 3 mass % to 70 mass %, preferably 5 mass % to 50 mass %, and more preferably 10 mass % to 40 mass %.

The compounds represented by the general formula (I) are, for example, preferably represented by general formula (I-A1), (I-B1), (I-C1), (I-D1), (I-E1), (I-A2), (I-B2), (I-C2), (I-D2), or (I-E2).

[Chem. 7]

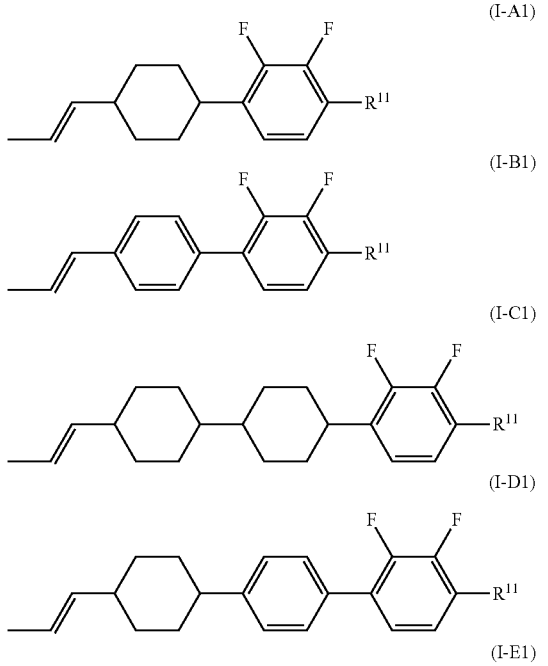

[Chem. 8]

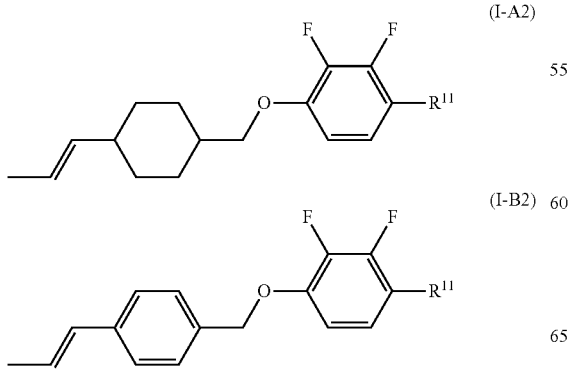

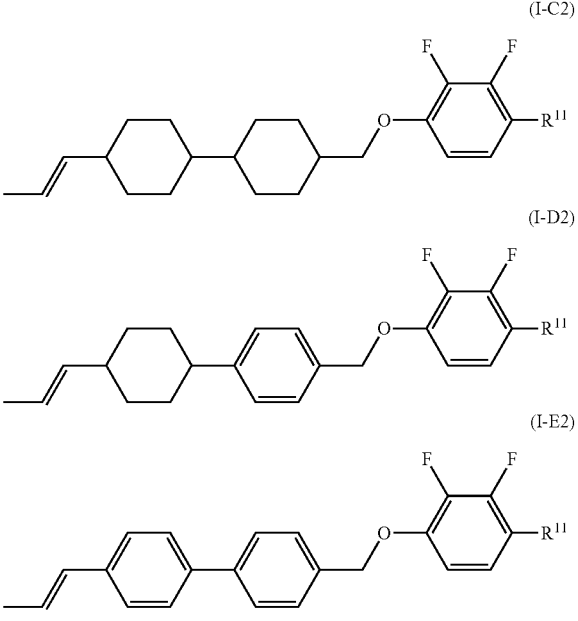

In the formulae, $R^{11}$ represents the same as above.

The liquid crystal composition of the present invention contains one or more liquid crystal compounds having a negative dielectric anisotropy ($\Delta\epsilon$) with an absolute value of 3 or more as a second component, preferably contains liquid crystal compounds having a negative dielectric anisotropy ($\Delta\epsilon$) with an absolute value of 4 or more, and more preferably contains liquid crystal compounds having a negative dielectric anisotropy ($\Delta\epsilon$) with an absolute value of 5 or more. The dielectric anisotropy ($\Delta\epsilon$) of a liquid crystal compound is determined by extrapolating the measurement value of dielectric anisotropy ($\Delta\epsilon$) of a composition prepared by adding 10 mass % of the liquid crystal compound to a liquid crystal composition whose dielectric anisotropy at 25° C. is about 0.

The second component preferably includes a compound selected from the group of compounds represented by general formula (II-A) and or general formula (II-B).

[Chem. 9]

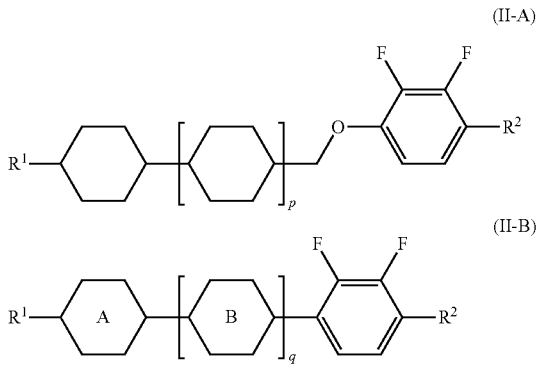

In the formulae, $R^1$ and $R^2$ each independently represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms; one —CH$_2$— or two or more non-adjacent —CH$_2$— in R$^1$ and R$^2$ may be each independently substituted with —O— and or —S—; one or more hydrogen atoms in R$^1$ and R$^2$ may be each independently substituted with a fluorine atom or a chlorine atom; and R$^1$ and R$^2$ do not represent a 1-propenyl group. R$^1$ and R$^2$ in the formulae preferably each independently represent a linear alkyl group having 1 to 5 carbon atoms, an alkoxy group having 1 to 5 carbon atoms, an alkenyl group having 2 to 5 carbon atoms, or an alkenyloxy group having 2 to 5 carbon atoms. More specifically, R$^1$ more preferably represents an alkenyl group having 2 to 5 carbon atoms to increase the elastic constant K$_{33}$.

Ring A and Ring B each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group. Ring A and Ring B preferably each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, or a 2,3-difluoro-1,4-phenylene group and more preferably each independently represent a trans-1,4-cyclohexylene group or a 1,4-phenylene group.

Furthermore, p and q each independently represent 0, 1, or 2 and preferably each independently represent 0 or 1.

More specifically, the general formula (II-A) preferably includes general formulae (II-A1) to (II-A5) and the general formula (II-B) preferably includes general formulae (II-B1) to (II-B5).

[Chem. 10]

(II-A1)

(II-A2)

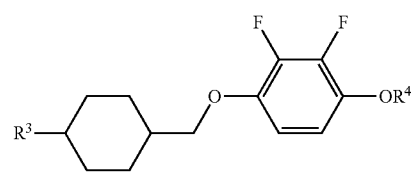

(II-A3)

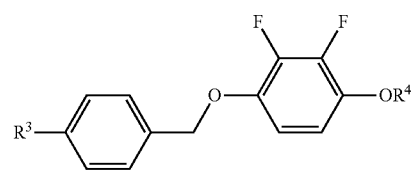

(II-A4)

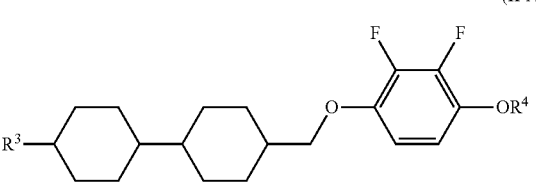

(II-A5)

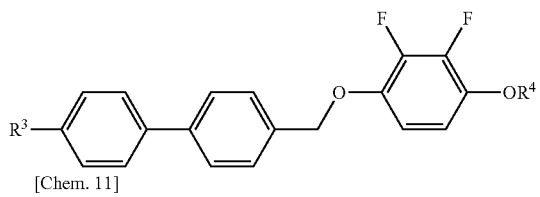

[Chem. 11]

(II-B1)

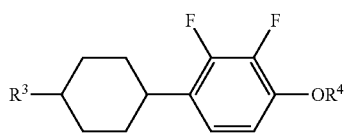

(II-B2)

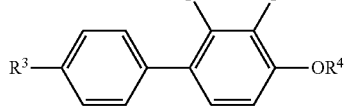

(II-B3)

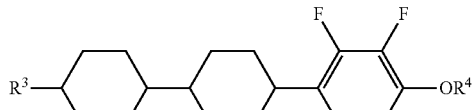

(II-B4)

(II-B5)

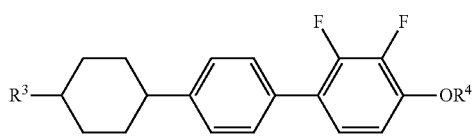

In the formulae, R$^3$ and R$^4$ each independently represent an alkyl group having 1 to 8 carbon atoms or an alkenyl group having 2 to 8 carbon atoms; one or more hydrogen atoms in R$^3$ and R$^4$ may be each independently substituted with a fluorine atom; and R$^3$ and R$^4$ do not represent a 1-propenyl group. R$^3$ and R$^4$ in the formulae preferably each independently represent a linear alkyl group having 1 to 5 carbon atoms or an alkenyl group having 2 to 5 carbon atoms. More specifically, one of R$^3$ and R$^4$ more preferably represents an alkenyl group having 2 to 5 carbon atoms to increase the elastic constant K$_{33}$.

The liquid crystal composition of the present invention contains one or more of the second components, preferably contains 1 to 15 of the second components, and more preferably 2 to 10 of the second components.

The content of the second component is 3 mass % to 70 mass %, preferably 5 mass % to 50 mass %, and more preferably 10 mass % to 40 mass %.

The liquid crystal composition of the present invention may further contain one or more compounds selected from the group of compound represented by general formula (III-A) to general formula (III-J) as a third component, and preferably contains 1 to 10 compounds selected from the general formulae (III-A), (III-D), (III-F), (III-G), and (III-H).

[Chem. 12]

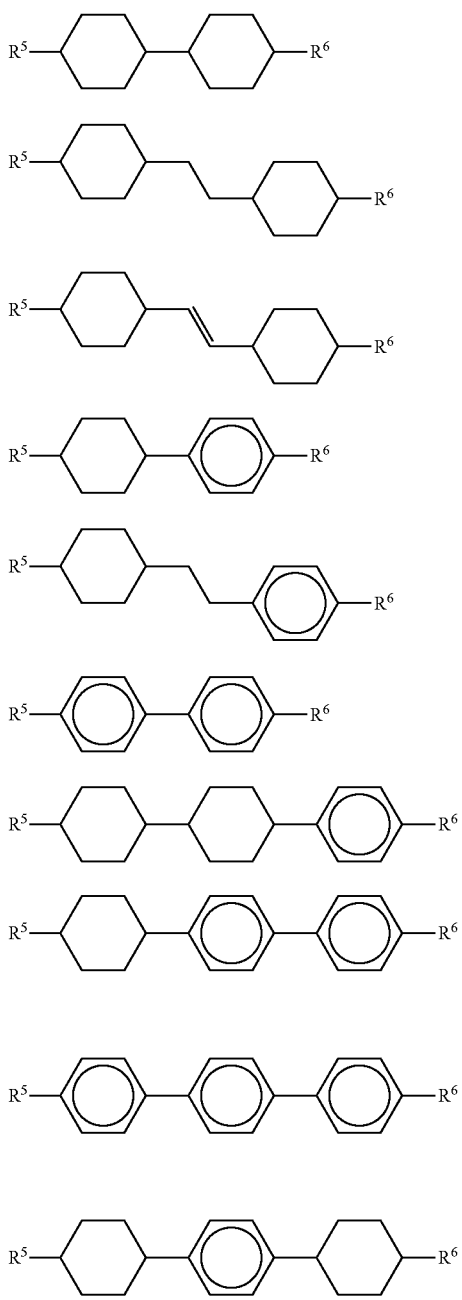

(III-A)
(III-B)
(III-C)
(III-D)
(III-E)
(III-F)
(III-G)
(III-H)
(III-I)
(III-J)

In the formulae, $R^5$ represents an alkyl group having 1 to 5 carbon atoms or an alkenyl group having 2 to 5 carbon atoms, and $R^6$ represents an alkyl group having 1 to 5 carbon atoms, an alkoxy group having 1 to 5 carbon atoms, an alkenyl group having 2 to 5 carbon atoms, or an alkenyloxy group having 2 to 5 carbon atoms. In the compound represented by the general formula (III-A), $R^5$ preferably represents an alkenyl group having 2 to 5 carbon atoms, and $R^6$ preferably represents an alkyl group having 1 to 5 carbon atoms.

One or more compounds represented by general formula (V) may be contained as an additional component.

[Chem. 13]

(V)

In the formula, $R^{21}$ and $R^{22}$ each independently represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms. $R^{21}$ and $R^{22}$ preferably each independently represent an alkyl group having 1 to 5 carbon atoms or an alkenyl group having 2 to 5 carbon atoms.

The liquid crystal composition of the present invention preferably contains the compounds represented by the general formula (I), the general formula (II-A1), and the general formula (II-A2) at the same time, more preferably contains the compounds represented by the general formula (I), the general formula (II-A1), the general formula (II-A2), and the general formula(III-A) at the same time, and further preferably contains the compounds represented by the general formula (I), the general formula (II-A1), the general formula (II-A2), the general formula (III-A), and the general formula (V) at the same time.

The liquid crystal composition of the present invention preferably contains the compounds represented by the general formula (I), the general formula (II-B1), and the general formula (III-A) at the same time and more preferably contains the compounds represented by the general formula (I), the general formula (II-B1), the general formula (III-A), and the general formula (V) at the same time.

The liquid crystal composition of the present invention preferably contains the compounds represented by the general formula (I), the general formula (II-A), and the general formula (II-B) at the same time. Specifically, the liquid crystal composition preferably contains the compounds represented by the general formula (I), the general formula (II-A1), the general formula (II-A2), and the general formula (II-B1) at the same time and more preferably contains the compounds represented by the general formula (I), the general formula (II-A1), the general formula (II-A2), the general formula (II-B1), the general formula (III-A), and the general formula (V) at the same time.

In the liquid crystal composition of the present invention, the dielectric anisotropy (Δ∈) at 25° C. is −2.0 to −8.0, preferably −2.0 to −6.0, more preferably −2.0 to −5.0, and particularly preferably −2.5 to −4.0.

In the liquid crystal composition of the present invention, the refractive index anisotropy (Δn) at 20° C. is 0.08 to 0.14, preferably 0.09 to 0.13, and more preferably 0.09 to 0.12. More specifically, Δn is preferably 0.10 to 0.13 when a small cell gap is employed and 0.08 to 0.10 when a large cell gap is employed.

In the liquid crystal composition of the present invention, the viscosity (II) at 20° C. is 10 to 30 mPa·s, preferably 10 to 25 mPa·s, and more preferably 10 to 22 mPa·s.

In the liquid crystal composition of the present invention, the rotational viscosity (γ1) at 20° C. is 60 to 130 mPa·s, preferably 60 to 110 mPa·s, and more preferably 60 to 100 mPa·s.

In the liquid crystal composition of the present invention, the nematic phase-isotropic liquid phase transition temperature ($T_{ni}$) is 60° C. to 120° C., preferably 70° C. to 100° C., and more preferably 70° C. to 85° C.

In addition to the above compounds, the liquid crystal composition of the present invention may contain typical nematic liquid crystal, smectic liquid crystal, cholesteric liquid crystal, an antioxidant, an ultraviolet absorber, a polymerizable monomer, and the like.

For example, a polymerizable compound such as a biphenyl derivative or a terphenyl derivative is contained as a polymerizable monomer, and the content of the polymerizable compound is preferably 0.01% to 2%.

[Chem. 14]

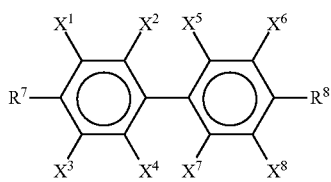

(IV)

More specifically, the liquid crystal composition of the present invention preferably contains one or more polymerizable compounds represented by general formula (IV).

In the formula, $R^7$ and $R^8$ each independently represent any of groups represented by formula (R-1) to formula (R-15) below.

[Chem. 15]

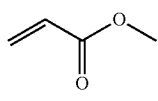

(R-1)

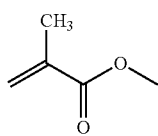

(R-2)

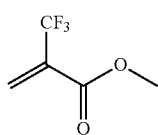

(R-3)

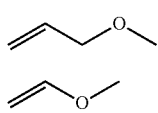

(R-4)

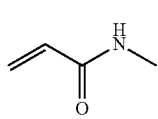

(R-5)

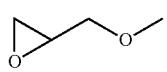

(R-6)

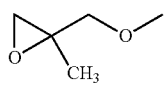

(R-7)

(R-8)

(R-9)

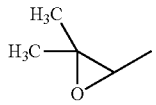

(R-10)

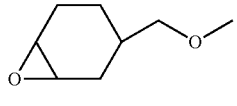

(R-11)

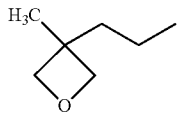

(R-12)

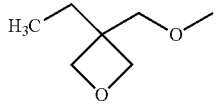

(R-13)

(R14)

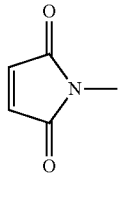

(R-15)

HS—

$X^1$ to $X^8$ each independently represent a trifluoromethyl group, a trifluoromethoxy group, a fluorine atom, or a hydrogen atom.

The biphenyl skeleton in the general formula (IV) is preferably selected from biphenyl skeletons represented by formula (IV-11) to formula (IV-14) and is more preferably a biphenyl skeleton represented by formula (IV-11).

[Chem. 16]

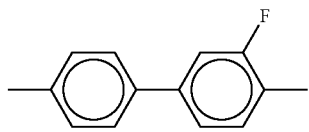

(IV-11)

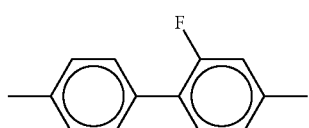

(IV-12)

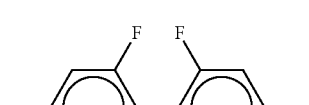

(IV-13)

(IV-14)

Polymerizable compounds having the skeletons represented by the formula (IV-11) to the formula (IV-14) exhibit an optimum anchoring strength after being polymerized, and thus a good alignment state is achieved.

A polymerizable compound-containing liquid crystal composition that contains the first component, the second component, the third component, and the polymerizable compound represented by the general formula (IV) in the present invention at the same time has a low viscosity (η), a low rotational viscosity (γ1), and a high elastic constant ($K_{33}$). Therefore, a PSA mode or PSVA mode liquid crystal display device that uses such a polymerizable compound-containing liquid crystal composition can achieve high-speed response.

A liquid crystal display device that uses the liquid crystal composition of the present invention has a distinguished feature of high-speed response and is particularly useful as an active matrix driving liquid crystal display device. The liquid crystal display device is applicable to a VA mode, PSVA mode, PSA mode, IPS mode, or ECB mode liquid crystal display device.

EXAMPLES

The present invention will now be further described in detail on the basis of Examples, but the present invention is not limited to Examples. In compositions of Examples and Comparative Examples below, "%" means "mass %". In Examples, the following abbreviations are used for the description of compounds.

| | (Side chain) | |
|---|---|---|
| -n | —$C_nH_{2n+1}$ | linear alkyl group having n carbon atoms |
| n- | $C_nH_{2n+1}$— | linear alkyl group having n carbon atoms |
| —On | —$OC_nH_{2n+1}$ | linear alkoxy group having n carbon atoms |
| nO— | $C_nH_{2n+1}O$— | linear alkoxy group having n carbon atoms |
| —V | —CH=$CH_2$ | |
| V— | $CH_2$=CH— | |
| —V1 | —CH=CH—$CH_3$ | |
| 1V— | $CH_3$—CH=CH— | 1-propenyl group |
| -2V | —$CH_2$—$CH_2$—CH=$CH_2$ | 1-propenyl group |
| V2- | $CH_3$=CH—$CH_2$—$CH_2$— | |
| -2V1 | —$CH_2$—$CH_2$—CH=CH—$CH_3$ | |
| 1V2- | $CH_3$—CH=CH—$CH_2$—$CH_2$ | |
| | (Linking group) | |
| -nO— | —$C_nH_{2n}O$— | |
| | (Ring structure) | |

[Chem. 17]

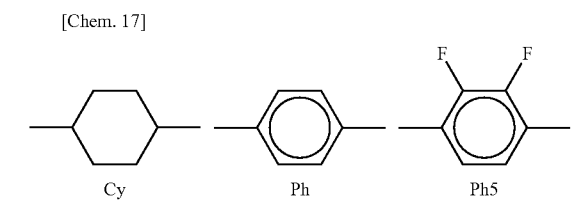

Cy    Ph    Ph5

In Examples, the measured properties are as follows.

$T_{ni}$: nematic phase-isotropic liquid phase transition temperature (° C.)

Δn: refractive index anisotropy at 20° C.

Δ∈: dielectric anisotropy at 25° C.

η: viscosity (mPa·s) at 20° C.

γ1: rotational viscosity (mPa·s) at 20° C.

$K_{33}$: elastic constant $K_{33}$ (pN) at 20° C.

Comparative Examples 1 and 2 and Examples 1, 2, and 3

LC-A (Comparative Example 1), LC-B (Comparative Example 2), LC-1 (Example 1), LC-2 (Example 2), and LC-3 (Example 3) each having a composition listed in Table 1 were prepared, and the physical properties were measured. The results are as follows.

TABLE 1

| | | Comparative Example 1 LC-A | Comparative Example 2 LC-B | Example 1 LC-1 | Example 2 LC-2 | Example 3 LC-3 |
|---|---|---|---|---|---|---|
| 1V-Cy-1O—Ph5—O2 | General formula (I) | — | — | 11 | 12 | 12 |
| 1V-Cy-Cy-1O—Ph5—O2 | General formula (I) | — | — | 13 | 12 | 12 |
| 2-Cy-1O—Ph5—O2 | General formula (II-A) | 3 | 3 | — | — | — |
| 3-Cy-1O—Ph5—O2 | General formula (II-A) | 6 | 5 | — | — | 2 |
| 2-Cy—Cy-1O—Ph5—O2 | General formula (II-A) | 10 | 7 | 13 | 4 | 4 |
| 3-Cy—Cy-1O—Ph5—O2 | General formula (II-A) | 10 | 7 | — | 4 | 4 |
| 4-Cy—Cy-1O—Ph5—O2 | General formula (II-A) | 10 | 7 | — | — | — |
| V-Cy—Cy-1O—Ph5—O2 | General formula (II-A) | — | 10 | — | 5 | — |
| 3-Cy—Ph—Ph5—O2 | General formula (II-B) | — | — | — | — | 4 |
| 3-Cy—Cy—V | General formula (III-A) | 38 | 38 | 38 | 42 | 39 |
| 3-Cy—Cy—V1 | General formula (III-A) | — | — | 4 | — | 3 |

TABLE 1-continued

| | | Comparative Example 1 LC-A | Comparative Example 2 LC-B | Example 1 LC-1 | Example 2 LC-2 | Example 3 LC-3 |
|---|---|---|---|---|---|---|
| 3-Ph—Ph-1 | General formula (III-F) | 3 | 3 | 3 | 1.5 | 3 |
| 5-Ph—Ph-1 | General formula (III-F) | 2 | 2 | — | 1.5 | — |
| 3-Ph—Ph5—Ph-1 | General formula (V) | 9 | 9 | 9 | 4 | — |
| 3-Ph—Ph5—Ph-2 | General formula (V) | 9 | 9 | 9 | 4 | — |
| V2-Ph—Ph5—Ph-2V | General formula (V) | — | — | — | 10 | 12 |
| 1V2-Ph—Ph5—Ph-2V1 | General formula (V) | — | — | — | — | 5 |
| Total | | 100 | 100 | 100 | 100 | 100 |
| Tni [° C.] | | 76.1 | 76.3 | 76.0 | 76.2 | 76.4 |
| $\Delta n$ | | 0.108 | 0.109 | 0.108 | 0.108 | 0.109 |
| $\eta$ [mPa·s] | | 14.6 | 14.5 | 14.1 | 13.7 | 13.9 |
| $\gamma 1$ [mPa·s] | | 98 | 99 | 99 | 96 | 95 |
| $\Delta\epsilon$ | | −3.2 | −3.1 | −3.2 | −3.1 | −3.2 |
| $K_{33}$ [pN] | | 13.9 | 14.2 | 16.0 | 15.8 | 16.1 |
| $\gamma 1/K_{33}$ | | 7.1 | 7.0 | 6.2 | 6.1 | 5.9 |

The liquid crystal compositions LC-1, LC-2, and LC-3 of the present invention had a low viscosity (11), a low rotational viscosity ($\gamma 1$), and a considerably high elastic constant ($K_{33}$). Therefore, $\gamma 1/K_{33}$ of LC-1, LC-2, and LC-3 were 6.2, 6.1, and 5.9, respectively, which were much lower than those of LC-A and LC-B of Comparative Examples. The response speed of each of liquid crystal display devices including the liquid crystal compositions was measured. The liquid crystal display devices including LC-1, LC-2, and LC-3 had a sufficiently high response speed, which was higher than the response speed of LC-A and LC-B by 10% or more. Furthermore, the voltage holding ratio (VHR) was measured, and it was confirmed that high VHR was achieved. The cell thickness was 3.5 μm and the alignment film was JALS2096. The response speed was measured at 20° C. using DMS301 manufactured by AUTRONIC-MELCHERS with Von of 5.5 V and Voff of 1.0 V. The VHR was measured using VHR-1 manufactured by TOYO Corporation at a voltage of 5 V at a frequency of 60 Hz at a temperature of 60° C. Although the conditions of injection into liquid crystal cells (pressure and the ODF method) were changed, the physical properties did not change.

Comparative Example 3 and Example 4

LC-C (Comparative Example 3) and LC-4 (Example 4) each having a composition listed in Table 2 were prepared, and the physical properties were measured. The results are as follows.

TABLE 2

| | | Comparative Example 3 LC-C | Example 4 LC-4 |
|---|---|---|---|
| 1V-Cy—Ph5-2 | General formula (I) | — | 4 |
| 1V-Cy-1O—Ph5—O2 | General formula (I) | — | 7 |
| 1V-Cy—Cy—Ph5-1 | General formula (I) | — | 4 |
| 1V-Cy—Cy-1O—Ph5—O2 | General formula (I) | — | 7 |
| 3-Cy-1O—Ph5—O1 | General formula (II-A) | 5 | — |
| 3-Cy—Cy-1O—Ph5—O2 | General formula (II-A) | 10 | 3 |
| V-Cy—Cy-1O—Ph5—O2 | General formula (II-A) | 10 | 8 |
| 3-Cy—Ph5-2 | General formula (II-B) | 4 | — |
| 3-Cy—Cy—Ph5-1 | General formula (II-B) | 4 | — |
| 3-Cy—Cy—V | General formula (III-A) | 37 | 37 |
| 3-Cy—Cy-2 | General formula (III-A) | — | 3 |
| 5-Ph—Ph-1 | General formula (III-F) | 8 | 5 |
| 3-Ph—Ph5—Ph-1 | General formula (V) | 8 | 8 |
| 3-Ph—Ph5—Ph-2 | General formula (V) | 11 | 11 |
| 3-Ph—Ph5—Ph-3 | General formula (V) | 3 | 3 |
| Total | | 100 | 100 |
| Tni [° C.] | | 72.3 | 73.1 |
| $\Delta n$ | | 0.114 | 0.114 |
| $\eta$ [mPa·s] | | 13.9 | 13.5 |
| $\gamma 1$ [mPa·s] | | 90 | 88 |
| $\Delta\epsilon$ | | −2.7 | −2.7 |
| $K_{33}$ [pN] | | 13.2 | 14.4 |
| $\gamma 1/K_{33}$ | | 6.8 | 6.1 |

The liquid crystal composition LC-4 of the present invention had a low viscosity ($\eta$), a low rotational viscosity ($\gamma 1$), and a high elastic constant ($K_{33}$). Therefore, $\gamma 1/K_{33}$ of LC-4 was 6.1, which was much lower than that of LC-C of Comparative Example. The response speed of each of liquid crystal display devices including the liquid crystal compositions was measured. The liquid crystal display device including LC-4 had a higher response speed than the liquid crystal display device including LC-C. Furthermore, the voltage holding ratio (VHR) was measured, and it was confirmed that high VHR was achieved. The cell thickness was 3.5 μm and the alignment film was JALS2096. The response speed was measured at 20° C. using DMS301 manufactured by AUTRONIC-MELCHERS with Von of 5.5 V and Voff of 1.0 V. The VHR was measured using VHR-1 manufactured by TOYO Corporation at a voltage of 5 V at a frequency of 60 Hz at a temperature of 60° C. Although the conditions of injection into liquid crystal cells (pressure and the ODF method) were changed, the physical properties did not change.

Comparative Example 4 and Example 5

LC-D (Comparative Example 4) and LC-5 (Example 5) each having a composition listed in Table 3 were prepared, and the physical properties were measured. The results are as follows.

TABLE 3

| | | Comparative Example 4 LC-D | Example 5 LC-5 |
|---|---|---|---|
| 1V-Cy—Ph5-2 | General formula (I) | — | 7 |
| 1V-Cy—Cy—Ph5-1 | General formula (I) | — | 7 |
| 3-Cy—Ph5—O2 | General formula (II-B) | 12 | 5 |
| 3-Ph—Ph5—O2 | General formula (II-B) | 10 | 10 |
| 3-Cy—Cy—Ph5—O2 | General formula (II-B) | 11 | 4 |
| 2-Cy—Ph—Ph5—O2 | General formula (II-B) | 7 | 7 |
| 3-Cy—Ph—Ph5—O4 | General formula (II-B) | 7 | 7 |
| 4-Cy—Ph—Ph5—O3 | General formula (II-B) | 6 | 6 |
| 3-Cy—Cy-2 | General formula (III-A) | 19 | 23 |
| 3-Cy—Cy-4 | General formula (III-A) | 6 | 4 |
| 3-Cy—Cy-5 | General formula (III-A) | 6 | 4 |
| 3-Cy—Cy—V1 | General formula (III-A) | 10 | 10 |
| 3-Cy—Cy—Ph-1 | General formula (III-G) | 6 | 6 |
| Total | | 100 | 100 |
| Tni [° C.] | | 76.3 | 76.5 |
| Δn | | 0.093 | 0.095 |
| η [mPa · s] | | 16.7 | 16.8 |
| γ1 [mPa · s] | | 101 | 99 |
| Δε | | −2.8 | −2.8 |
| $K_{33}$ [pN] | | 13.5 | 14.4 |
| $γ1/K_{33}$ | | 7.5 | 6.7 |

The liquid crystal composition LC-5 of the present invention had a low viscosity (η), a low rotational viscosity (γ1), and a high elastic constant ($K_{33}$). Therefore, $γ1/K_{33}$ of LC-5 was 6.7, which was much lower than that of LC-D of Comparative Example. The response speed of each of liquid crystal display devices including the liquid crystal compositions was measured. The liquid crystal display device including LC-5 had a higher response speed than the liquid crystal display device including LC-D. Furthermore, the voltage holding ratio (VHR) was measured, and it was confirmed that high VHR was achieved. The cell thickness was 3.5 μm and the alignment film was JALS2096. The response speed was measured at 20° C. using DMS301 manufactured by AUTRONIC-MELCHERS with Von of 5.5 V and Voff of 1.0 V. The VHR was measured using VHR-1 manufactured by TOYO Corporation at a voltage of 5 V at a frequency of 60 Hz at a temperature of 60° C. Although the conditions of injection into liquid crystal cells (pressure and the ODF method) were changed, the physical properties did not change. It was confirmed from the above results that the liquid crystal composition of the present invention had sufficiently low a sufficiently low rotational viscosity γ1, a high elastic constant $K_{33}$, and a negative dielectric anisotropy (Δε) with a high absolute value without decreasing Δn and $T_{ni}$, and a VA mode liquid crystal display device that uses the liquid crystal composition had high display quality and high response speed.

The invention claimed is:

1. A liquid crystal composition comprising:
   a first component comprising one or more fluorobenzene derivatives having a 1-propenyl group represented by general formula (I-1), and one or more fluorobenzene derivatives having a 1-propenyl group represented by general formula (I-2); and
   one or more liquid crystal compounds having negative Δε with an absolute value of 3 or more as a second component,

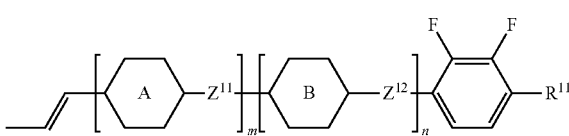

(I-1)

in the general formula (I-2), $R^{11}$ represents an alkyl group having 1 to 5 carbon atoms, an alkoxy group having 1 to 5 carbon atoms, an alkenyl group having 2 to 5 carbon atoms, or an alkenyloxy group having 2 to 5 carbon atoms; $Z^{11}$ and $Z^{12}$ each represent —CH$_2$O—,—or a single bond; Ring A and Ring B each represent a trans-1,4-cyclohexylene group, a 1,4-phenylene group, or a 1,4-cyclohexenylene group; and m and n each independently represent 0 or 1,

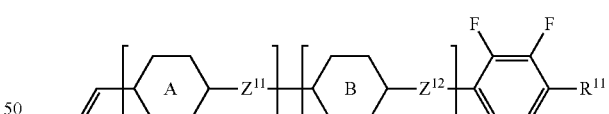

(I-2)

in the general formula (I-2). $R^{11}$ represents an alkyl group having 1 to 5 carbon atoms, an alkoxy group having 1 to 5 carbon atoms, an alkenyl group having 2 to 5 carbon atoms, or an alkenyloxy group having 2 to 5 carbon atoms; $Z^{11}$ represents a single bond and $Z^{12}$ represents —CH$_2$O—, —CF$_2$O—, —CH$_2$CH$_2$—, or a single bond; Ring A and Ring B each independently represent a trans-1,4-cyclohexylene group, a 1,4-phenylene group, or a 1,4-cyclohexenylene group; and m represents 1 and n represents 1,
   wherein the one or more fluorobenzene derivatives having a 1-propenyl group represented by general formula (I-1) includes a compound wherein m represenis 0 and n represents 1.

2. The liquid crystal composition according to claim 1, wherein the second component includes one or more compounds selected from the group of compounds represented by general formula (II-A) and/or general formula (II-B),

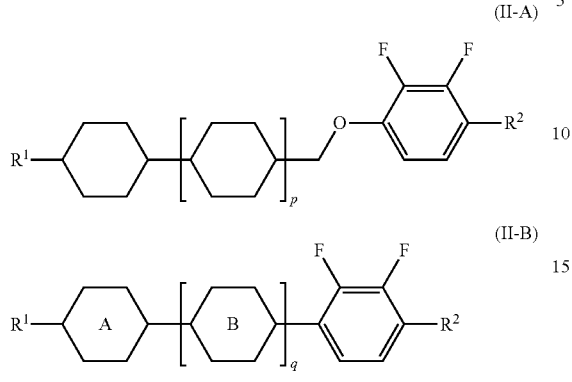

in the formulae, $R^1$ and $R^2$ each independently represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms; one -$CH_2$- or two or more non-adjacent -$CH_2$- in $R^1$ and $R^2$ may be each independently substituted with -O- and or -S-; one or more hydrogen atoms in $R^1$ and $R^2$ may be each independently substituted with a fluorine atom or a chlorine atom; $R^1$ and $R^2$ do not represent a 1-propenyl group; Ring A and Ring B each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclooctylene group, a piperidine-1,4-diyl group, a naphthalene-2,6-diyl group, a decahydronaphthalene-2,6-diyl group, or a 1,2,3,4-tetrahydronaphthalene-2,6-diyl group; and p and q each independently represent 0, 1, or 2.

3. The liquid crystal composition according to claim 1, wherein a content of the first component is 3 mass % to 70 mass %.

4. The liquid crystal composition according to claim 1, wherein a content of the second component is 3 mass % to 70 mass %.

5. The liquid crystal composition according to claim 2, wherein the compounds represented by the general formula (II-A) are compounds represented by general formulae (II-A1) to (II-A5) and the compounds represented by the general formula (II-B) are compounds represented by general formulae (II-B1) to (II-B5),

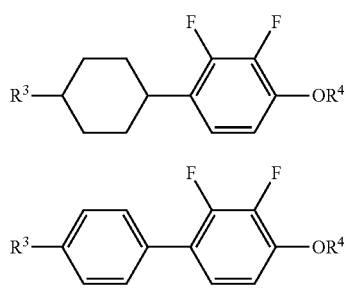

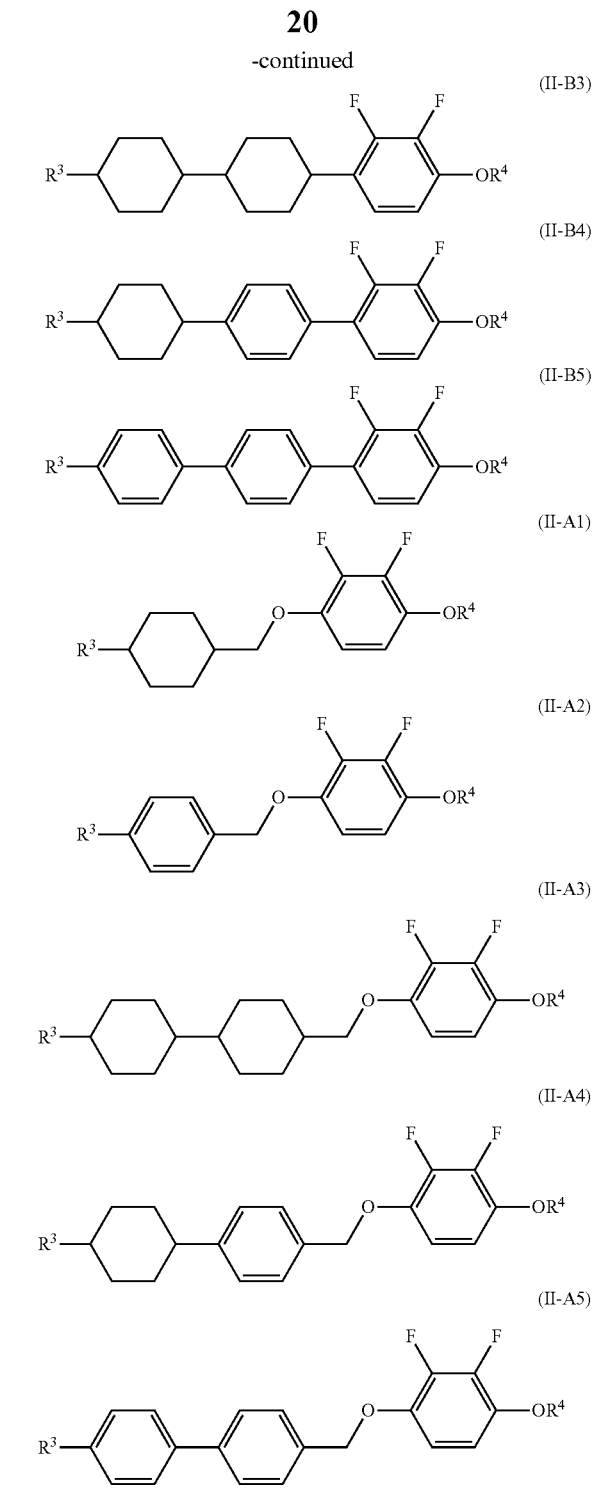

in the formulae, $R^3$ and $R^4$ each independently represent an alkyl group having 1 to 8 carbon atoms or an alkenyl group having 2 to 8 carbon atoms; one or more hydrogen atoms in $R^3$ and $R^4$ may be each independently substituted with a fluorine atom; and $R^3$ and $R^4$ do not represent a 1-propenyl group.

6. The liquid crystal composition according to claim 1, comprising, as a third component, one or more compounds selected from the group of compounds represented by general formulae (III-A) to (III-J),

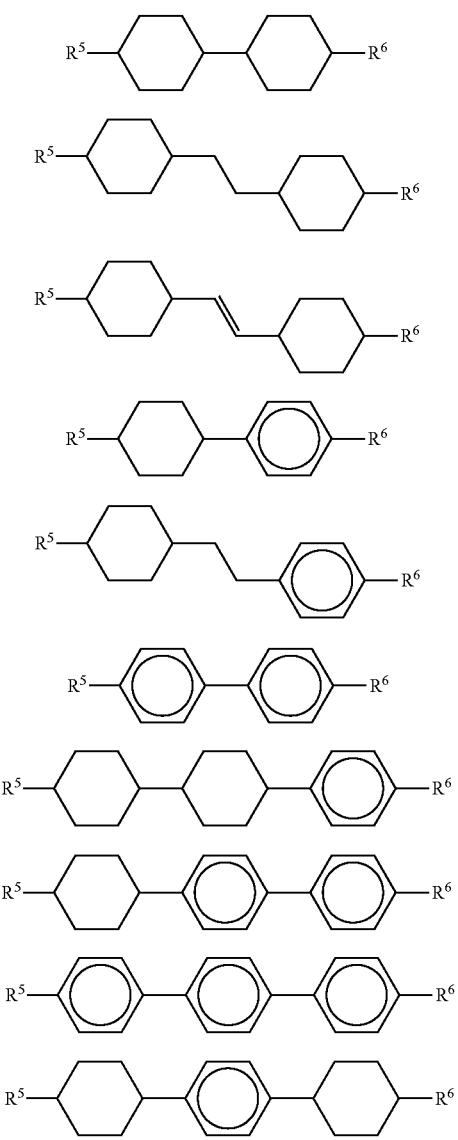

in the formulae, le represents an alkyl group having 1 to 5 carbon atoms or an alkenyl group having 2 to 5 carbon atoms, and $R^6$ represents an alkyl group having 1 to 5 carbon atoms, an alkoxy group having 1 to 5 carbon atoms, an alkenyl group having 2 to 5 carbon atoms, or an alkenyloxy group having 2 to 5 carbon atoms.

7. The liquid crystal composition according to claim 1, comprising, as an additional component, one or more compounds represented by general formula (V),

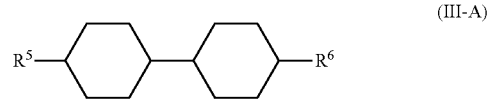

in the formula, $R^{21}$ and $R^{22}$ each independently represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms.

8. The liquid crystal composition according to claim 7, wherein the compounds represented by the general formula (I-1), the general formula (II-A), the general formula (III-A), and the general formula (V) are contained at the same time, (III-A)

in the formulae, $R^5$ represents an alkyl group having 1 to 5 carbon atoms or an alkenyl group having 2 to 5 carbon atoms, and $R^6$ represents an alkyl group having 1 to 5 carbon atoms, an alkoxy group having 1 to 5 carbon atoms, an alkenyl group having 2 to 5 carbon atoms, or an alkenyloxy group having 2 to 5 carbon atoms.

9. The liquid crystal composition according to claim 7, wherein the compounds represented by the general formula (I-1), the general formula (II-B), the general formula (III-A), and the general formula (V) are contained at the same time, (III-A)

in the formulae, $R^5$ represents an alkyl group having 1 to 5 carbon atoms or an alkenyl group having 2 to 5 carbon atoms, and $R^6$ represents an alkyl group having 1 to 5 carbon atoms, an alkoxy group having 1 to 5 carbon atoms, an alkenyl group having 2 to 5 carbon atoms, or an alkenyloxy group having 2 to 5 carbon atoms.

10. The liquid crystal composition according to claim 7, wherein the compounds represented by the general formula (I-1), the general formula (II-A), the general formula (II-B), the general formula (III-A), and the general formula (V) are contained at the same time, (III-A)

in the formulae, $R^5$ represents an alkyl group having 1 to 5 carbon atoms or an alkenyl group having 2 to 5 carbon atoms, and $R^6$ represents an alkyl group having 1 to 5 carbon atoms, an alkoxy group having 1 to 5 carbon atoms, an alkenyl group having 2 to 5 carbon atoms, or an alkenyloxy group having 2 to 5 carbon atoms.

11. The liquid crystal composition according to claim 1, comprising a polymerizable compound.

12. The liquid crystal composition according to claim 11, comprising, as the polymerizable compound, one or more compounds represented by general formula (IV),

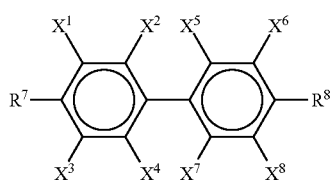

(IV)

in the formula, $R^7$ and $R^8$ each independently represent any of groups represented by formula (R-1) to formula (R-15) below,

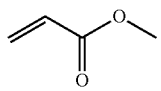
(R-1)

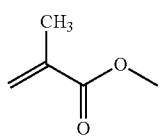
(R-2)

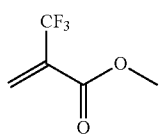
(R-3)

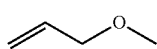
(R-4)

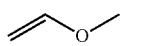
(R-5)

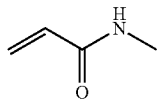
(R-6)

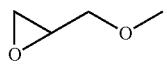
(R-7)

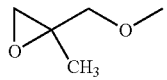
(R-8)

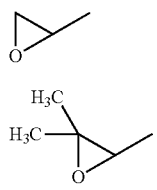
(R-9)

(R-10)

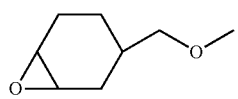
(R-11)

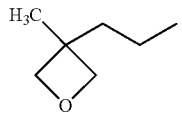
(R-12)

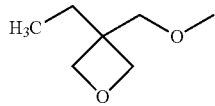
(R-13)

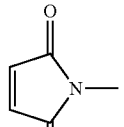
(R14)

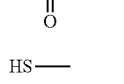
(R-15)

and $X^1$ to $X^8$ each independently represent a trifluoromethyl group, a trifluoromethoxy group, a fluorine atom, or a hydrogen atom.

13. A liquid crystal display device using the liquid crystal composition according to claim 1.

14. An active matrix driving liquid crystal display device using the liquid crystal composition according to claim 1.

15. A liquid crystal display device for a VA mode, a PSA mode, a PSVA mode, an IPS mode, or an ECB mode, the liquid crystal display device using the liquid crystal composition according to claim 1.

* * * * *